(12) United States Patent
Kirkwood

(10) Patent No.: US 6,350,213 B1
(45) Date of Patent: Feb. 26, 2002

(54) DIRECT COMPUTER CONTROLLED ELECTRO HYDRAULIC DEVICE FOR MULTI-SPEED TRANSMISSION FRICTION ELEMENT CONTROL

(75) Inventor: Malcolm E. Kirkwood, Livonia, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/606,718

(22) Filed: Jun. 29, 2000

(51) Int. Cl.$^7$ ................................................ F16H 31/00
(52) U.S. Cl. ........................................ 475/116; 475/137
(58) Field of Search .................................. 475/116, 137

(56) References Cited

U.S. PATENT DOCUMENTS

| | | |
|---|---|---|
| 4,350,058 A | 9/1982 | Miller |
| 4,722,247 A | 2/1988 | Shindo |
| 4,724,723 A | 2/1988 | Lockhart |
| 4,790,418 A | 12/1988 | Brown |
| 4,947,970 A | 8/1990 | Miller |
| 5,012,699 A | 5/1991 | Aoki |
| 5,062,321 A | 11/1991 | Koenig |
| 5,115,659 A | 5/1992 | Takami |
| 5,467,854 A | 11/1995 | Creger |
| 5,496,231 A | 3/1996 | Eaton |
| 5,505,100 A | 4/1996 | Mitchell |
| 5,551,930 A | 9/1996 | Creger |
| 5,601,506 A | 2/1997 | Long |
| 5,605,517 A | 2/1997 | Sherman |
| 5,616,093 A | 4/1997 | Long |
| 5,803,869 A | 9/1998 | Jamzadeh |

*Primary Examiner*—Dirk Wright
(74) *Attorney, Agent, or Firm*—Artz & Artz P.C.; Greg Dziegielewski

(57) ABSTRACT

An electro-hydraulic pump module (10) for controlling the upshifting and downshifting of an automatic power transmission. The pump module (10) includes a plurality of individual pumps (12, 14) each in communication with a fluid source (34). Each of the plurality of individual pumps (12, 14) is in fluid communication with a respective switching valve (44, 52). Each of the switching valves (44, 52) controls the flow of fluid from a respective pump to a friction element to accomplish a desired gearshift. The plurality of pumps (12, 14) and the switching valves (44, 52) are each in fluid communication with an electronic control module (70). The electronic control module (70) activates an appropriate one of the plurality of pumps (12, 14) and an associated switching valve (44, 52) to direct fluid to the necessary friction element to drive the transmission in the appropriate gear.

18 Claims, 2 Drawing Sheets

DIRECT COMPUTER CONTROLLED ELECTRO HYDRAULIC DEVICE FOR MULTI-SPEED TRANSMISSION FRICTION ELEMENT CONTROL

TECHNICAL FIELD

The present invention relates generally to the control of friction elements in order to accomplish ratio changes in an automatic planetary transmission. More particularly, the present invention relates to the direct computer control of multi-speed transmission friction elements through the use of hydraulic devices to accomplish ratio changes in an automatic planetary transmission.

BACKGROUND OF THE PRESENT INVENTION

Automatic transmissions for motor vehicles are arranged to shift gears automatically, dependent on running conditions of the motor vehicle, to achieve desired vehicle running characteristics. It is customary to provide a ratio changing event map composed of upshifting and downshifting strategies for each gear position. The strategies are established in relation to the vehicle speed/operator commands engine/power output, so as to control the automatic transmission to change ratios according to the ratio changing event control strategies.

One type of automatic transmission includes a power transmission system comprising a plurality of power transmission paths (e.g., a plurality of gear trains), a plurality of ratio changing devices (e.g., a plurality of hydraulically operated clutches) for selecting the power transmission paths, and a control mechanism (e.g., a hydraulic pressure control valve) for controlling the operation of the ratio changing devices. When operating conditions of a motor vehicle are transitory within a predetermined ratio changing event strategy, ratio changing commands are produced to effect an upshift or a downshift, and a solenoid valve is operated based on the ratio change command to control operation of the hydraulic pressure control valve to engage one of the hydraulically operated clutches. The power transmission path through a certain gear train associated with the engaged clutch is then selected to effect a ratio change.

The gear ratio of the previous gear position (which is established by a power transmission path or gear train that has been selected until a ratio change command is issued), and the gear ratio of a next ratio position (which is established by a power transmission path or gear train selected by the ratio change command) are different from each other. Therefore, it is important that the transmission ratio changing event be carefully controlled in order to avoid event shock or delay when a ratio change is made from the previous position to the subsequent position. The timing of the shift, which is controlled by one friction element coming off and another friction element coming on is therefore critical to efficient operation of an automatic transmission.

Efforts to control the operation of the control mechanism (e.g., the pressure control valve) in an attempt to provide efficient timing and, therefore, to eliminate any ratio change event shock or delay, have employed a variety of mechanisms. One such known mechanism involves the use of a variable force solenoid. A typical variable force solenoid receives a control signal from an ECU which in turn controls the pressure control valve to communicate with and control the pressure profile to selected friction elements, in order to engage the proper gear. However, this method relies on the receipt of information from the pressure control valve as to the vehicle operating conditions, in the form of feedback. Based on this feedback, a pressure control signal is transferred in order to control the output of the solenoid valve to generate the required pressure profile. This type of control system is relatively complex. The prior mechanisms and systems also suffer from the inability to provide consistent functional characteristics.

Another known mechanism for controlling a pressure control valve is a simple on/off solenoid which signals a hydraulic control system to control the operation of a friction element to engage or disengage as dictated by a specific pressure profile activating the appropriate gear. This type of control system is also relatively complicated and complex. These prior mechanisms and systems also suffer from the inability to provide consistent functional characteristics.

Additionally, typical pumps that are used in current automatic transmissions are driven directly by the engine. The typical transmission pumps are thus always running at engine speed, resulting in parasitic losses for a majority of a typical duty cycle. This is because current pumps are sized for worst case mode of operational envelope, which is typically only a small portion of the time. It would thus be advantageous to provide an automatic transmission that provides precise control of the ratio changing events with a system that is compact, efficient, consistent, and relatively simple.

SUMMARY OF THE INVENTION

It is, therefore, an object of the present invention to provide a highly responsive electro-hydraulic pump for multi-speed transmission friction element control that is computer controlled.

It is another object of the present invention to provide a modular electro-hydraulic pump for multi-speed transmission friction element control that provides improved efficiency and decreased parasitic loss.

It is yet a further object of the present invention to provide an independent system that mitigates against undesirable fluctuation in operation fluid temperature.

It is still a further object of the present invention to provide a modular electro-hydraulic pump for multi-speed transmission friction element control that requires a smaller space envelop than prior systems and also provides effective thermal management.

It is yet another object of the present invention to provide for multi-speed transmission friction element control that operates in real time to provide on demand pressure profiling as desired.

In accordance with the above and other objects of the present invention, an electro-hydraulic pump element for use with an automatic power transmission is provided. The pump element includes a fluid source having a quantity of fluid stored therein. The pump element includes a plurality of individual pump elements each having a respective inlet end and a respective outlet end. The fluid source is in communication with each of the inlet ends of the plurality of pump elements via a passageway in order to convey fluid thereto. The outlet ends of each of the plurality of pump elements is in communication with a respective switching valve in order to distribute the fluid flow and specific pressure profile to a respective friction element, as required to accomplish ratio changing. The plurality of pump elements and the switching valves are each in communication with an electronic control module for control thereof, whereby the electronic control module activates an appropriate one of the plurality of pump elements and an associated switching valve to direct fluid to the necessary friction element as determined by the control module.

These and other features and advantages of the present invention will become apparent from the following description of the invention, when viewed in accordance with the accompanying drawings and appended claims.

BEST MODE(S) FOR CARRYING OUT THE INVENTION

Figure 1:
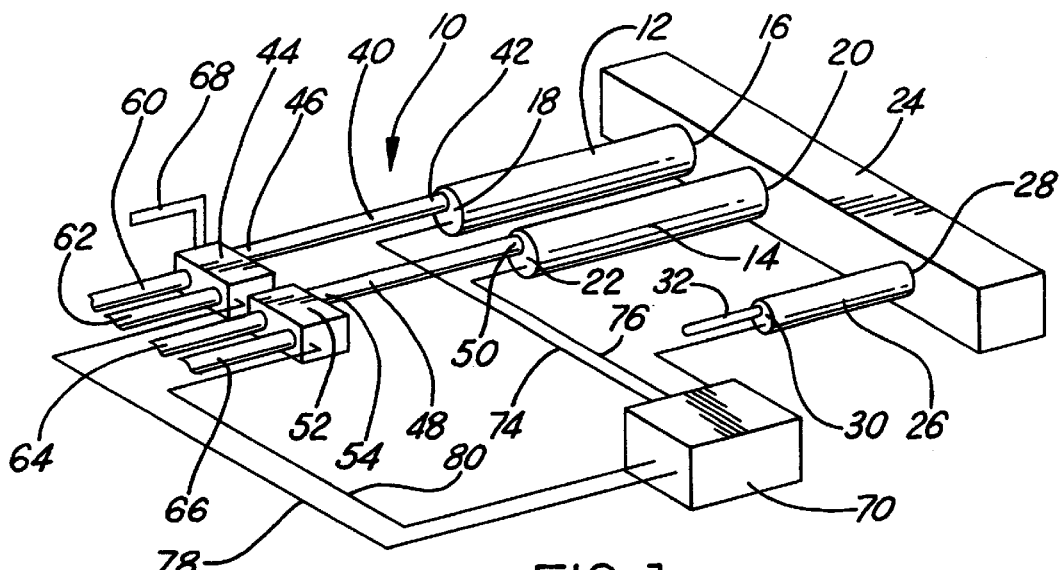
FIG. 1 is a schematic perspective view of an electro-hydraulic pump module for controlling a plurality of friction shifting elements of an automatic transmission in accordance with a preferred embodiment of the present invention.

Referring now to the figures, which illustrate an electro-hydraulic pump module 10 in accordance with the present invention. As shown in the drawings, and as described below, the pump module 10 is preferably for use in connection with a vehicular automatic transmission. However, it will be appreciated that the pump module 10 can be used in a variety of other applications including automotive and non-automotive applications.

The electro-hydraulic pump module 10 includes a first pump element 12, and a second pump element 14. While the disclosed pump module 10 includes two individual pump elements, it should be understood that more or less pump elements may be utilized. For example, a single individual pump element may be utilized or more than two individual pump elements may be utilized as desired depending upon the structure and characteristics of the system being controlled. Additionally, the type of electro-hydraulic pump element is not critical and may vary depending upon the specific application for which the pump module is utilized.

The first pump element 12 has an inlet end 16 and a outlet end 18 opposing the inlet end 16. The second pump element 14 has an inlet end 20 and an outlet end 22 opposing the inlet end 20. It should be understood that while the outlet ends are shown disposed opposite the inlet ends, this configuration is merely exemplary and the disposition of the inlet ends with respect to the outlet ends can take on a variety of different configurations, including being disposed on adjacent sides.

The respective inlet ends 16, 20 of the first and second pump elements 12, 14 are each in fluid communication with a filter 24. The inlet ends 16, 20 can be partially disposed within the filter 24, in abutting relation therewith, or otherwise in fluid communication. The filter 24 is also in fluid communication with a lubrication pump 26 at an inlet end 28. The lubrication pump 26 has an outlet end 30 opposing the inlet end 28, with the inlet end 28 in communication with a lubrication source through the filter 24. The lubrication pump 26 conveys a fluid from the filter 24 through a conduit 32 for use by the torque converter 110 and lube circuits 35.

Figure 2:
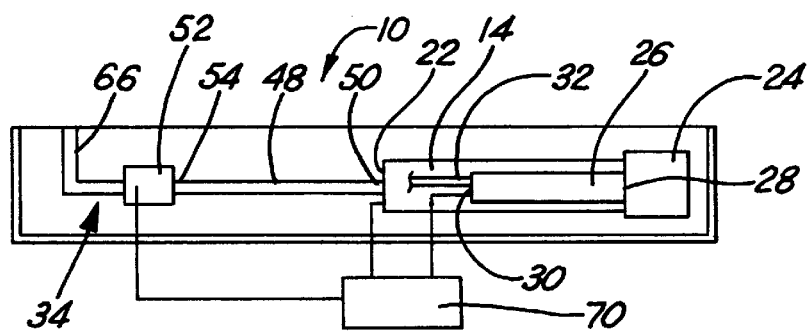
FIG. 2 is a schematic side view of the electro-hydraulic pump module of FIG. 1.

In the preferred embodiment, the fluid is automatic transmission fluid and the lubricant source is the automatic transmission pan 34 (FIG. 2). It should be understood that a variety of other known fluids may be utilized and that the fluids can be provided from a variety of known fluid sources. The inlet ends 16, 20, and 28 of the first pump elements 12, the second pump element 14 and the lubrication pump 26, respectively each draw fluid from the lubricant source 34.

Figure 3:
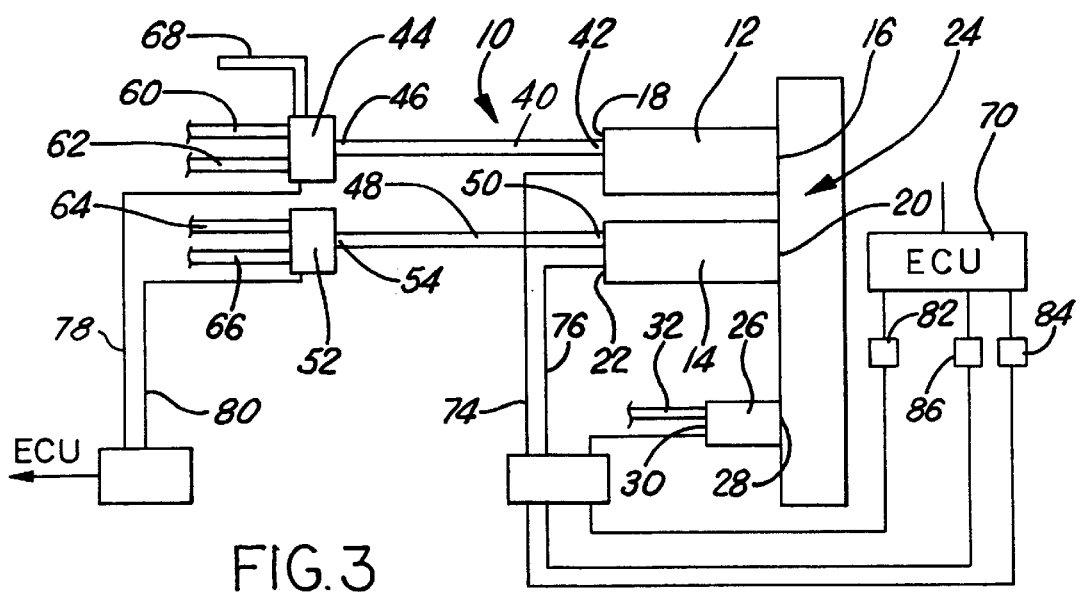
FIG. 3 is a schematic top view of the electro-hydraulic pump module of FIG. 1.
Figure 4:
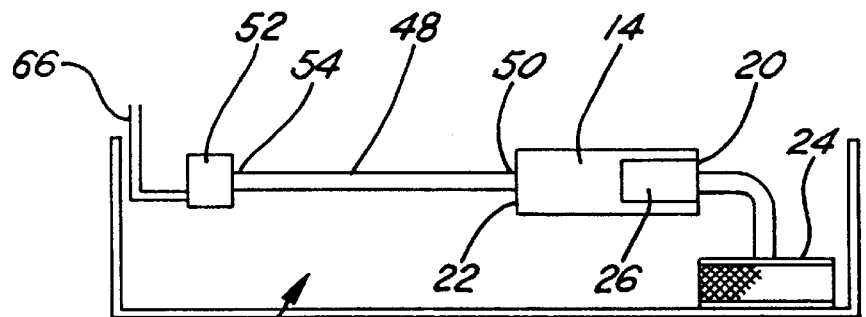
FIG. 4 is a schematic side view of an electro-hydraulic pump module positioned in an oil pan in accordance with a preferred embodiment of the present invention.

As shown in FIGS. 1 and 3, the first pump element 12 has a first pump element conduit 40 that is in fluid communication at a first end 42 with the outlet end 18 of the first pump element 12. The first pump element conduit 40 is in fluid communication with a first switching valve 44 at a second end 46 which opposes the first end 42. The second pump element 14 has a second pump element conduit 48 that is in fluid communication at a first end 50 with the outlet end 22 of the second pump element 14. The second pump element conduit 48 is in fluid communication with a second switching valve 52 at a second end 54 which opposes the first end 50. It will be understood that if more or less pump elements are used, more or less corresponding switching valves will also be used.

The first switching valve 44 has a first passage 60 and a second passage 62 each in fluid communication with the first pump element conduit 40. The first passage 60 extends from the first switching valve 44 and into fluid communication with a friction element (shown schematically in FIG. 5) to enable the transmission to select first gear. The second passage 62 also extends from the first switching valve 44 and into fluid communication with another friction element to enable the transmission to select third gear when commanded by the switching valve 44. The first passage 60 and the second passage 62 preferably extend from a side of the first switching valve 44 that is opposite to or distal to the first pump element conduit 40.

The second switching element 52 has a first passage 64 and a second passage 66 each in fluid communication with the second pump element conduit 48. The first passage 64 extends from the second switching valve 52 and into fluid communication with a friction element (shown schematically in FIG. 5) to enable the transmission to select second gear. The second passage 66 extends from the second switching valve 52 and into fluid communication with another friction element to enable the automatic transmission to select fourth gear when commanded by the switching valve 52. The first passage 64 and the second passage 66 preferably extend from a side of the second switching valve 52 that is opposite to or distal to the second pump conduit 50.

Another passageway 68 preferably extends from the first switching valve 44 and into fluid communication with another friction element to enable the transmission to select reverse gear when commanded by the first switching valve 44. It should be understood that a variety of passageways can extend from each respective switching valve. Further, the friction elements that each of the respective switching valves control can also vary and the embodiment disclosed in the specification is merely exemplary. Further, more or less friction elements can be controlled depending upon the configuration of the system being controlled. It also should be understood that both pumps or multiple pumps can be operating at the same time to control the friction elements.

The operation of the electro-hydraulic pump modules 10 is controlled by an electronic control unit (ECU) 70. The ECU 70 is in electrical communication with the lubrication pump 26 via line 72. The ECU 70 is also in electrical communication with the first and second pump elements 12, 14 through lines 74, 76, respectively. Additionally, the ECU 70 is in electrical communication with the first and second switching valves 44, 52 through lines 78, 80, respectively. As shown in FIG. 3, the ECU 70 is in communication with a respective pump driver or electronic current control device for providing the amount of current necessary to drive each of the pump elements 12, 14. The ECU 70 also controls a lubrication pump driver 82 for driving the lubrication pump 26. The ECU 70 controls a first pump driver 84 for driving the first pump element 12 and a second pump driver 86 for driving the second pump element 14.

In an illustrative operation of the disclosed pump module 10, the ECU 70 controls the starting and stopping of the individual pump elements 12, 14. The ECU 70 also controls the operation of the lubrication pump 26 to provide fluid for use by the torque converter 110 and lube circuits 35, by delivering fluid thereto from the lubrication source, such as a transmission fluid pan 34. Based on a ratio selection mapping strategy, the ECU 70 will send a signal activating the necessary pump element 12, 14, depending upon the ratio to be accomplished and the required pressure profile as dictated by operational requirements. For purposes of the present invention, the ratio selection mapping strategy is not critical and any mapping strategy may be utilized. Additionally, the ECU 70 also controls the position of the switching valves 44, 52 such that the fluid flow to the proper friction element is controlled.

Figure 5:
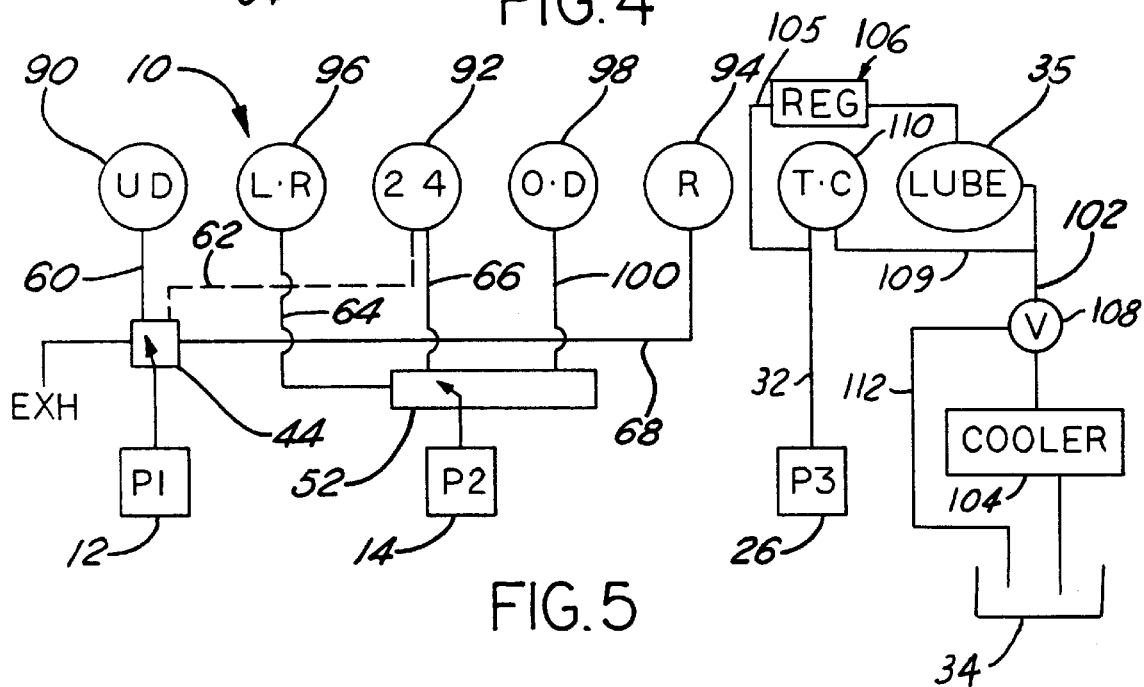
FIG. 5 is a schematic block diagram illustrating the operation of an exemplary electro-hydraulic pump module in accordance with a preferred embodiment of the present invention.

Referring now specifically to FIG. 5, which is a schematic illustration of an exemplary pump module 10 for controlling the actuation of a plurality of associated friction elements in accordance with the present invention. As discussed above, in this embodiment the electro-hydraulic pump module 10 includes the first pump element 12, the second pump element 14, and the lubrication pump 26. The first pump element 12 is in fluid communication with the first switching valve 44 and the second pump element 14 is in fluid communication with the second switching valve 52. The first pump element 12 and the second pump element 14 are in fluid communication with the lubrication fluid source 34.

The first passage 60 is in fluid communication with the underdrive friction element 90 such that selection of the underdrive friction element 90 is controlled by the first switching valve 44. The second passage 62 is in fluid communication with the gear 2-4 brake friction element 92, the selection of which is also controlled by the first switching valve 44. The passage 68 is in fluid communication with the reverse friction element 94. The selection of the reverse friction element is also controlled by the first switching valve 44.

The second pump element 14 is in fluid communication with the second switching valve 52, which in turn is in fluid communication with a low/reverse friction element 96 through the first passage 64. The second switching valve 52 is also in fluid communication with the gear 2-4 brake friction element 92 through the second passage 66. Additionally, the second switching valve 52 is in fluid communication with an overdrive friction element 98 through a third passage 100. As discussed above, the configuration of which friction elements that are controlled by which switching valves can be changed.

The lubrication pump 26 receives fluid from the lubrication source 34 through the filter 24. The lubrication pump 26 is in communication with the torque converter 110 and the lube circuit 35. Fluid from the lubrication pump 26 passes through the conduit 32 to the torque converter 110 and also into a conduit 105 in communication with the lube circuit 35. The fluid pressure is also controlled by a regulator 106, disposed in the conduit 105, with the regulator 106 in electrical communication with the ECU 70. Fluid exiting the torque converter 110 passes directly into conduit 102 through conduit 109. Similarly, fluid that exits the lube circuit 35 will also pass directly into the conduit 102. The third switching valve 108 is in communication with the conduit 102 to divert flow to the cooler 104 or directly to the pump through line 112. The lubrication pump 26, the cooler 104, and the regulator 106 form an independently controlled system that supplies both the torque converter 110 and the lube circuits 35 providing thermal management by moving a controlled volume of fluid into and out of the cooler 104.

The operation of the exemplary transmission is discussed below. In order to drive the exemplary transmission in first gear, the first pump element 12 and the second pump element 14 are energized through the control of the ECU 70. At the same time, the lubrication pump 26 is also energized by the ECU 70. The first pump element 12 and the second pump element 14 can draw fluid from the lubrication source 34 through the filter 24 for transfer through the outlet ends 18 and 22 of the respective pump elements 12 and 14. Further, the first switching valve 44 is positioned such that the underdrive friction element 90 is provided with fluid from the first pump element 12 through the passageway 60. At the same time, the second switching valve 52 is activated so that fluid is provided from the second pump element 14 through passageway 66 to the low/reverse brake friction element 92. The activation and positioning of the switching valves 44 and 52 are also controlled by the ECU 70.

In order to drive the transmission in second gear, the first pump element 12 and the second pump element 14 are energized by the ECU 70. Concurrently, the first switching valve 44 and the second switching valve 52 must be respectively positioned by the ECU 70. The first switching valve 44 is positioned such that the first pump element 12 provides fluid to the underdrive friction element 90 through the passage 60. The second switching valve 52 is positioned such that fluid is provided from the second pump element 14 to the gear 2-4 brake friction element 92 through passageway 62. At the same time, fluid may be drawn by the first and second pump elements 12 and 14 from the lubrication source 34. The lubrication pump 26 is also controlled by the ECU 70.

In order to drive the transmission in third gear, the first pump element 12 and the second pump element 14 are energized by the ECU 70 to draw fluid from the lubrication source 34. At the same time, the first and second switching valves 44 and 52 are positioned by the ECU 70. The first switching valve 44 is positioned such that fluid from the first pump element 12 is passed to the underdrive friction element 90 through passage 60. The second switching valve 52 is positioned such that fluid from the second pump element 14 is passed to the overdrive friction element 98 through the passage 100. Additionally, the lubrication pump 26 must be activated so that the torque converter 110 and the lube circuit 35 are activated.

To drive the transmission in fourth gear, the gear two-four friction brake element 92 must be activated by energizing the first pump element 12 and appropriately positioning the first switching valve 44 to direct fluid thereto through the passage 62. Further, the second pump element 14 must also be energized to activate the overdrive friction element 98 by positioning the second switching valve 52 to allow fluid from the second pump element 14 to pass through passage 100 to the overdrive friction element 98.

To drive the transmission in reverse, the reverse friction element 94 and the low/reverse friction element 96 must be simultaneously activated. This is accomplished by having the ECU 70 energize the first pump element 12 and the second pump element 14 and the associated switching valves 44, 52, to provide fluid to both the reverse friction element 94 and the low/reverse friction element 96. Obviously, the above example is merely illustrative of the various configurations or transmissions to be utilized by the disclosed electro-hydraulic pump module of the present invention. Ideally, the fewer pumps that are utilized, the more efficient and less costly the system will be. Additionally, the disclosed electro-hydraulic pump element is able to provide real time ratio change due to the highly responsive nature of the small individual pump elements. Further, because the pumps 12, 14, 26 are only activated electrically to supply demand only, when necessary to support transmission function, they are not mechanically connected to the engine which significantly decreases any parasitic loss. Thus, it can be seen that each individual pump element when in connection with the appropriate friction element through the ECU strategy creates a pressure profile required to create appropriate ratio change characteristics. While the above example utilizes two friction elements at a time to drive the transmission in the appropriate gear, this is not required and it can be accomplished by a single friction element or various other configurations.

Having now fully described the invention, it will be apparent to one of ordinary skill in the art that many changes and modifications can be made thereto without departing from the spirit or scope of the invention as set forth herein.

What is claimed is:

1. An electro-hydraulic pump module (10) for use with an automatic power transmission, comprising:
    a fluid source (34), having a quantity of fluid contained therein;
    a plurality of pump elements (12, 14) each having an inlet end (16, 20) and an outlet end (18, 22);
    said inlet ends (16, 20) of each of said plurality of pump elements (12, 14) being in fluid communication with said fluid source (34);
    at least one switching valve (44, 52) in fluid communication with said outlet end (18, 22) of each of said plurality of pump elements (12, 14) to allow fluid to flow to a respective friction element to accomplish gear shifting;
    an electronic control module (70) in communication with each of said plurality of pump elements (12, 14) and each of said switching valves (44, 52);
    whereby said electronic control module (70) activates an appropriate one of said plurality of pump elements (12, 14) and controls said appropriate one of said switching valves (44, 52) to direct fluid to said respective friction element as necessary.

2. The pump module of claim 1, wherein said fluid source (34) is a transmission fluid pan.

3. The pump module of claim 1, wherein the electro-hydraulic pump element (10) is disposed in said transmission fluid pan.

4. The pump module of claim 2, wherein a filter (24) is disposed between said transmission fluid pan and said plurality of pump elements.

5. The pump module of claim 4, wherein a first and second pump element (12, 14) are each in communication with said transmission fluid pan at their respective inlet ends (16, 20).

6. The pump module of claim 5, wherein a single switching valve (44, 52) is in fluid communication with each of said first pump element (12) and said second pump element (14).

7. The pump module of claim 6, wherein said switching valve (44) in communication with said first pump element (12) controls whether the transmission operates in a first gear or a third gear.

8. The pump module of claim 7, wherein said switching valve (52) in communication with said second pump element (14) controls whether the transmission operates in a second gear or a fourth gear.

9. The pump module of claim 1, further comprising a lubrication pump (26) for assisting in the communication of fluid from said fluid source (34) to a torque converter (110) and a lube circuit (35) including a plurality of pump elements (12, 14).

10. An electro-hydraulic pump module (10), comprising:
    a fluid source (34), having a quantity of fluid contained therein;
    a first pump element (12) in fluid communication with said fluid source (34) at an inlet end (16);
    a second pump element (14) in fluid communication with said fluid source (34) at an inlet end (20);
    a first switching valve (44) in fluid communication with an outlet end (18) of said first pump element (12), said first switching valve (44) having a plurality of outlet passages (60, 62) in fluid communication with said first pump element (12) at one end and in fluid communication with a respective friction element associated with a gear at an opposing end;
    a second switching valve (52) in fluid communication with an outlet end (22) of said second pump element (14), said second switching valve (52) having a plurality of outlet passages (64, 66) in fluid communication with said second pump element (14) at one end and in fluid communication with a respective friction element associated with a gear at an opposing end;
    an electronic control module (70) in communication with said first pump element (12), said second pump element (14), said first switching valve (44), and said second switching valve (52);
    whereby said electronic control module (70) activates either said first or second pump element (12, 14) and positions said associated switching valve (44, 52) to direct fluid to said appropriate friction element to engage said desired gear.

11. The pump module (10) of claim 10, wherein the pump module (10) is incorporated into an automatic power transmission.

12. The pump module (10) of claim 11, wherein the pump module (10) is located adjacent a transmission pan and said fluid source (34) is an automatic transmission fluid.

13. The pump module (10) of claim 11, further comprising a lubrication pump (26) for transferring fluid from said transmission pan to a torque converter (110) and a lube circuit (35) to control thermal management.

14. The pump module (10) of claim 11, wherein a filter (24) is disposed between said fluid source (36) and said first pump element (12) and said second pump element (14).

15. A method of operating an automatic planetary transmission through the use of an electro-hydraulic pump module (10), comprising:
    actuating a lubrication pump (26) to draw fluid from a fluid supply (34) and convey it to a lube circuit (35);
    actuating a first pump element (12) to draw fluid into an inlet end (16) from said fluid supply (34) and to expel the fluid out an outlet end (18);

positioning a first switching valve (44) such that fluid expelled from said outlet end (18) of said first pump element (12) is passed to an appropriate friction element to drive the transmission in a desired gear; and controlling the actuation of said lubrication pump (26) and said first pump element (12) and the position of said first switching valve (44) with an electronic control module (70).

16. The method of claim 15, further comprising:

actuating a second pump element (16) to draw fluid into an inlet end (20) from said fluid supply (34) and to expel the fluid out an outlet end (24); and positioning a second switching valve (52) such that fluid expelled from said outlet end (22) of said second pump element (14) is passed to an appropriate friction element to drive the transmission in a desired gear.

17. The method of claim 16, further comprising:

filtering the fluid before it enters said inlet end (16) of said first pump element (12) and said inlet end (20) of said second pump element (14).

18. The method of claim 15, further comprising:

cooling at least some of the fluid prior to delivering it to fluid supply (34) in order to provide thermal management over the module.

* * * * *